United States Patent
Ohmori et al.

(10) Patent No.: US 11,680,879 B2
(45) Date of Patent: Jun. 20, 2023

(54) STRENGTH TESTING METHOD AND STRENGTH EVALUATION DEVICE

(71) Applicant: IHI Inspection and Instrumentation Co., Ltd., Tokyo (JP)

(72) Inventors: Seiichi Ohmori, Yokahama (JP); Mami Ohmori, Yokohama (JP); Hideyuki Nakamura, Yokohama (JP); Hiraku Kawasaki, Yokohama (JP)

(73) Assignee: IHI Inspection and Instrumentation Co., Ltd., Tokyo (JP)

( * ) Notice: Subject to any disclaimer, the term of this patent is extended or adjusted under 35 U.S.C. 154(b) by 503 days.

(21) Appl. No.: 17/040,948

(22) PCT Filed: Feb. 21, 2019

(86) PCT No.: PCT/JP2019/006517
§ 371 (c)(1),
(2) Date: Sep. 23, 2020

(87) PCT Pub. No.: WO2019/187829
PCT Pub. Date: Oct. 3, 2019

(65) Prior Publication Data
US 2021/0018410 A1 Jan. 21, 2021

(30) Foreign Application Priority Data
Mar. 26, 2018 (JP) .............................. JP2018-058814

(51) Int. Cl.
*G01N 3/06* (2006.01)
*G01N 3/08* (2006.01)
(Continued)

(52) U.S. Cl.
CPC ................. *G01N 3/06* (2013.01); *G01N 3/08* (2013.01); *G01N 29/12* (2013.01); *G01N 29/14* (2013.01);
(Continued)

(58) Field of Classification Search
CPC .... G01N 3/06; G01N 3/08; G01N 2203/0017; G01N 2203/026; G01N 2203/0658;
(Continued)

(56) References Cited

U.S. PATENT DOCUMENTS 4,107,981 A 8/1978 Kanagawa et al.
2001/0047691 A1 12/2001 Dzenis
(Continued)

FOREIGN PATENT DOCUMENTS

| CN | 107702990 A | 2/2018 |
|---|---|---|
| JP | 2014-142273 A | 8/2014 |
| JP | 2017-166953 A | 9/2017 |
| WO | 2020/170360 A1 | 8/2020 |

OTHER PUBLICATIONS

Communication pursuant to Article 94(3) EPC dated Sep. 2, 2022 for European Patent Application No. 19775253.8.
(Continued)

*Primary Examiner* — Jonathan M Dunlap
(74) *Attorney, Agent, or Firm* — Volpe Koenig

(57) ABSTRACT

A tensile load is applied to the test body to increase with time, and an AE wave displacement in the test body is detected (step S1). From the detected AE wave, waveform data are generated for each time section (step S2). For each section, from the waveform data, spectrum data are generated (step S3), a peak of an intensity in the spectrum data is specified, a data part in which an intensity is at least a value of a set percentage of the peak in the spectrum data is extracted as processing target data (step S4), and from the processing target data, the most frequent value of frequency gravity centers is specified (step S5). The most frequent value for each section and a tensile load applied to the test body in each section are output as strength evaluation data for evaluating a tensile strength of the test body (step S6).

4 Claims, 3 Drawing Sheets

(51) Int. Cl.
*G01N 29/24* (2006.01)
*G01N 29/12* (2006.01)
*G01N 29/46* (2006.01)
*G01N 29/14* (2006.01)

(52) U.S. Cl.
CPC ......... *G01N 29/2437* (2013.01); *G01N 29/46* (2013.01); *G01N 2203/0017* (2013.01); *G01N 2203/026* (2013.01); *G01N 2203/0658* (2013.01); *G01N 2291/02827* (2013.01)

(58) Field of Classification Search
CPC ......... G01N 2291/02827; G01N 29/12; G01N 29/2437; G01N 29/46; G01N 29/14
See application file for complete search history.

(56) References Cited

U.S. PATENT DOCUMENTS

2022/0065764 A1\* 3/2022 Kawasaki ................ G01N 3/32
2022/0146385 A1\* 5/2022 Kawasaki ................ G01N 3/32

OTHER PUBLICATIONS

Extended European Search Report dated Mar. 24, 2021 for European Patent Application No. 19775253.8.
Hanel et al., "Determination of Load Condition of Standard Screws During Tensile Tests Using Acoustic Emission Anaylsis," Proceedings of 1995 IEEE Instrumentation and Measurement Technology Conference—IMTC '95, 1995, pp. 284-287 (1995).

\* cited by examiner

STRENGTH TESTING METHOD AND STRENGTH EVALUATION DEVICE

TECHNICAL FIELD

The present disclosure relates to a strength testing method for testing, for a tensile strength, a test body as a fiber reinforced composite material (fiber reinforced plastic (FRP)). The present disclosure further relates to a strength evaluation device that generates and outputs strength evaluation data for specifying a tensile strength of a test body. More specifically, the present disclosure relates to a technique of testing a test body for a tensile strength, based on acoustic emission (AE wave) generated in the test body by applying a tensile load to the test body.

BACKGROUND ART

FRP is used in rockets and aircrafts. Particularly, a carbon fiber reinforced composite material (carbon fiber reinforced plastic (CFRP)) is superior in strength and rigidity. FRP is broken after peeling of a laminate or breakage of fibers.

A technique of testing a fiber reinforced composite material for a tensile strength is described in PTL 1, for example. According to PTL 1, a tensile load applied to a test body that is a fiber reinforced composite material is increased as time elapses. In this regard, an AE wave generated in the test body by the tensile load is measured, a frequency center of gravity of the AE wave in each of a plurality of time sections is determined, and the tensile load in the section in which a frequency center of gravity decreases is determined as a tensile strength of the test body.

CITATION LIST

Patent Literatures

PTL 1: Japanese Patent Application Laid-open No. 2014-142273

SUMMARY OF INVENTION

Technical Problem

It is desired that a tensile strength of a test body can be determined in shorter processing time (e.g., in real time), based on detection data of an AE wave generated in the test body by applying a tensile load to the test body.

For that reason, an object of the present disclosure is to provide a technique that can shorten processing time required to determine a tensile strength of a test body, based on detection data of an AE wave generated in the test body by applying a tensile load to the test body.

Solution to Problem

In order to accomplish the above-described object, according to the present disclosure, there is provided a strength testing method of testing, for a tensile strength, a test body that is a fiber reinforced composite material, the method comprising:

applying a tensile load to the test body so as to increase as time elapses, and detecting, at each time point, by an AE sensor, a displacement of an AE wave generated in the test body by the tensile load;

generating, based on the displacement of an AE wave detected at each time point, for each section of time, waveform data that represents a displacement of the AE wave at each time point;

generating, for each of the sections, from the waveform data, spectrum data representing an intensity of an AE wave at each frequency;

specifying, for each of the sections, a peak of an intensity in the spectrum data;

extracting, for each of the sections, as processing target data, a data part that is included in the spectrum data and in which an intensity is equal to or higher than a value of a set percentage of the peak;

specifying, for each of the sections, a most frequent value of frequency centers of gravity, based on the processing target data; and outputting, as strength evaluation data for evaluating a tensile strength of the test body, the most frequent value for each of the sections and a tensile load applied to the test body in each of the sections.

According to the present disclosure, there is provided a strength evaluation device wherein when a tensile load is applied to a test body as a fiber reinforced composite material so as to increase as time elapses, based on an AE wave generated in the test body by the tensile load, the strength evaluation device generates data enabling evaluation of a tensile strength of the test body, the strength evaluation device comprising:

a waveform generation unit that generates waveform data for each section of time, based on a displacement of the AE wave detected at each time point by an AE sensor, the waveform data representing the displacement of an AE wave at each time point;

a spectrum generation unit that generates spectrum data from the waveform data for each of the sections, the spectrum data representing an intensity of an AE wave at each frequency;

a data extraction unit that specifies a peak of an intensity in the spectrum data for each of the sections, and extracts, as processing target data, a data part that is included in the spectrum data and in which an intensity is equal to or higher than a value of a set percentage of the peak;

a most-frequent-value specifying unit that specifies a most frequent value of frequency centers of gravity of an AE wave in each of the sections, based on the processing target data for the section; and an evaluation data output unit that outputs, as strength evaluation data, the most frequent value for each of the sections and a tensile load applied to the test body in each of the sections.

Advantageous Effects of Invention

According to the above-described present disclosure, for each section of time, spectrum data are generated from waveform data of an AE wave generated in a test body by a tensile load, a peak of an intensity in the spectrum data is specified, and a data part that is included in the spectrum data and in which an intensity is equal to or higher than a value of a set percentage of the peak is extracted as processing target data. Accordingly, processing on all the spectrum data is unnecessary, and thus, a tensile strength of the test body can be determined in shorter processing time (e.g., in real time).

DESCRIPTION OF EMBODIMENT

Figure 1:
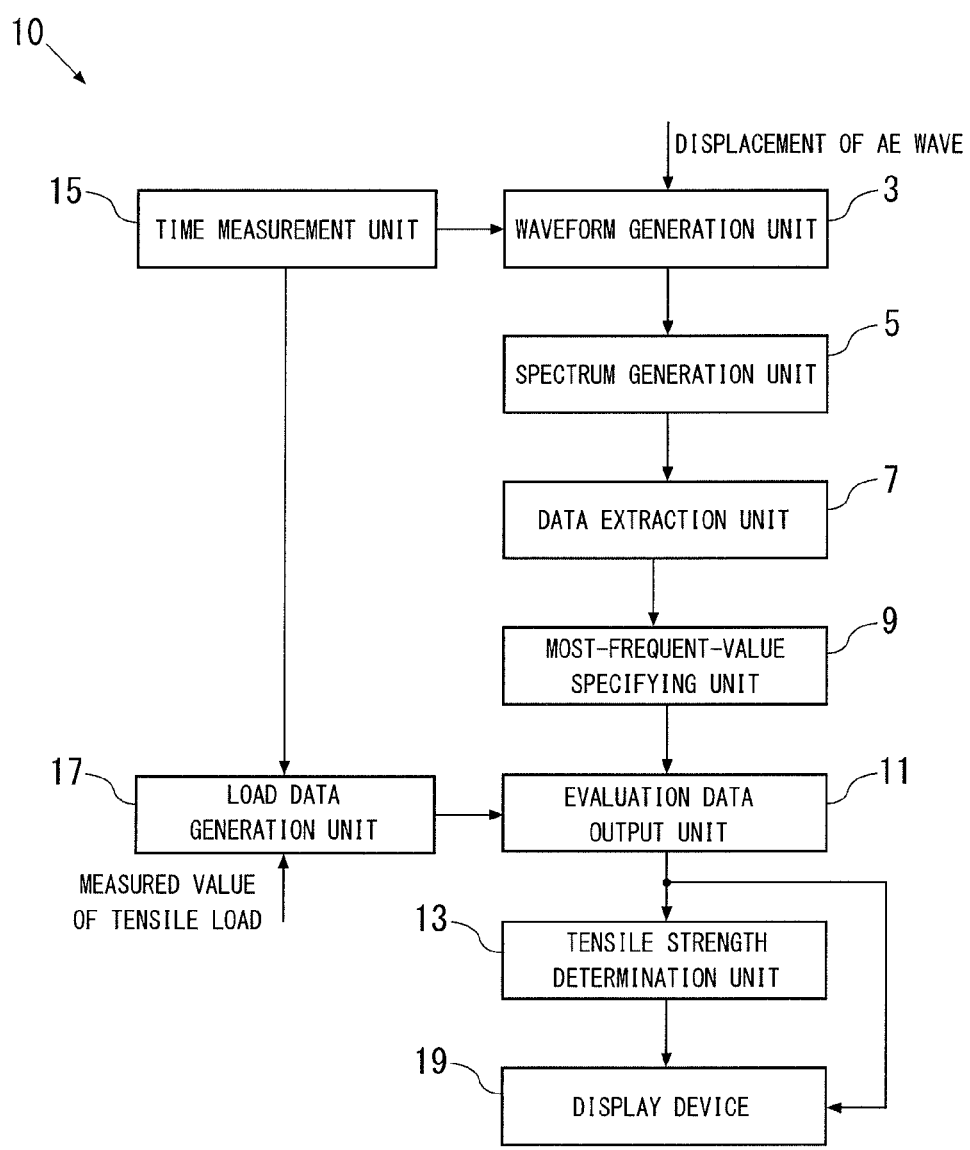
FIG. 1 is a block diagram illustrating a configuration of a strength evaluation device according to an embodiment of the present disclosure.

The following describes an embodiment of the present disclosure with reference to the drawings. In the drawings, the common parts are denoted by the same reference signs, and overlapping description is omitted.

[Strength Evaluation Device]

FIG. 1 is a block diagram illustrating a configuration of a strength evaluation device 10 according to an embodiment of the present disclosure. The strength evaluation device 10 is a device that generates data enabling evaluation of a tensile strength of a test body. In other words, when a tensile load is applied to a test body that is a fiber reinforced composite material (e.g., CFRP) such that the tensile load is increased as time elapses, the strength evaluation device 10 generates data, based on an AE wave generated in the test body by the tensile load, the generated data enabling evaluation of a tensile strength of the test body.

The strength evaluation device 10 includes a waveform generation unit 3, a spectrum generation unit 5, a data extraction unit 7, a most-frequent-value specifying unit 9, and an evaluation data output unit 11.

Based on a displacement of an AE wave detected by an AE sensor at each time point in a test period, the waveform generation unit 3 generates waveform data representing a displacement of the AE wave at each time point, for each time section (hereinafter, simply referred to also as a section) in the test period. The test period is a period from a test start time point when a tensile load started to be applied to the test body to a test end time point when application of the tensile load to the test body is ended. During the test period, the tensile load is applied to the test body so as to be gradually increased. The AE sensor is attached to the test body, detects a displacement (vibration displacement) of an AE wave at each time point in the test period, and inputs the detected displacement to the waveform generation unit 3. A displacement of an AE wave may be a positive or negative value proportional to a magnitude of the AE wave. A plurality of (e.g., a large number of) sections constituting the test period may be temporally continuous.

The AE sensor inputs a detected displacement of an AE wave to the waveform generation unit 3 every moment in the test period. Based on time measured by a time measurement unit 15, the waveform generation unit 3 generates the above-described waveform data in which the input displacement of an AE wave is associated with the measured time. The thus-configured waveform generation unit 3 generates, for each of the time sections in a test period, waveform data of the section, and inputs the waveform data of each section to the spectrum generation unit 5. The time measurement unit 15 may be a constituent element of the strength evaluation device 10.

For each section, the spectrum generation unit 5 generates spectrum data from the input waveform data of the section. In other words, the spectrum generation unit 5 transforms the waveform data of each section into spectrum data. The waveform data represent a displacement (intensity) of an AE wave with respect to time, and the spectrum data represent an intensity of an AE wave with respect to a frequency. This transform may be performed by the fast Fourier transform (FFT). The spectrum generation unit 5 inputs the generated spectrum data of each section to the data extraction unit 7.

For each section, the data extraction unit 7 specifies a peak (i.e., the maximum value) of an intensity in input spectrum data of the section, and extracts, as processing target data, a data part that is included in the spectrum data and in which an intensity is equal to or higher than a value of a set percentage of the peak. The set percentage may be a percentage (10% in one example) in a range equal to or larger than 5% and equal to or smaller than 30%, for example. However, the set percentage may be determined (e.g., by an experiment) depending on a type of a test body or other conditions. The data extraction unit 7 inputs the extracted processing target data of each section to the most-frequent-value specifying unit 9.

The processing target data of each section are data included in the spectrum data generated by the spectrum generation unit 5. In the processing target data of each section, each frequency at which an intensity is equal to or higher than a value of the set percentage of the peak is associated with the intensity at the frequency. In the processing target data of each section, an intensity that is included in the spectrum data generated by the spectrum generation unit 5 and that is at each frequency at which an intensity is smaller than the value of the set percentage of the peak may be set to be zero.

The most-frequent-value specifying unit 9 specifies, for each section, the most frequent value (hereinafter, simply referred to also as the most frequent value) of frequency centers of gravity in the section, based on input processing target data of the section, and generates most-frequent-value data representing the specified most frequent value in each section. In other words, the most-frequent-value data are data in which the most frequent value in each section is associated with the section. The most-frequent-value specifying unit 9 determines the most frequent value in each section by the following procedure.

First, the most-frequent-value specifying unit 9 performs transform on processing target data of each section from data of an intensity with respect to a frequency into data (hereinafter, referred to as processing target time data) of an intensity with respect to time.

Next, concerning each section, for each of a plurality of (e.g., a large number of) subsections constituting the section, the most-frequent-value specifying unit 9 determines a frequency center Fg of gravity of an AE wave for the processing target time data in the subsection. In other words, the most-frequent-value specifying unit 9 transforms the processing target time data in the subsection into spectrum data of an intensity with respect to a frequency, and concerning the spectrum data, determines a frequency center Fg of gravity of an AE wave. A plurality of subsections (hereinafter, simply referred to also as subsections) constituting one section may be temporally continuous. A length of the section and a length of the subsection are may be approximately 1 second and approximately 800 microseconds respectively in one example, but may be determined (e.g., by an experiment) depending on a type of a test body or other conditions. A frequency center Fg of gravity is expressed by the following equation (1).

$$Fg=\Sigma(Fi \times Pi)/\Sigma Pi \quad (1)$$

Here, Fi represents each frequency, and Pi represents a frequency component (i.e., an intensity of an AE wave at the frequency) of an AE wave for the subsection. An attached sign i of Fi and Pi is an index value for distinguishing a plurality of frequencies from each other, and takes an value ranging from 1 to n (n is an integer equal to or larger than 2, and is preferably a sufficiently large value), and Σ represents the total sum for all the values of i.

Next, concerning each section, the most-frequent-value specifying unit 9 specifies, as the most frequent value of frequency centers Fg of gravity, a frequency center Fg of gravity that is among frequency centers Fg of gravity of a plurality of subsections included in the section and that most frequently appears. In other words, among frequency centers Fg of gravity determined for a plurality of subsections included in the section, the most frequently determined frequency center Fg of gravity is specified as the most frequent value of frequency centers of gravity by the most-frequent-value specifying unit 9. For example, for the purpose of simplicity, it is assumed that the subsections 1 to 10 exist in the target section, a frequency center F1 of gravity is determined for the four subsections 1, 2, 3, and 7 (i.e., F1 is determined four times), a frequency center F2 of gravity is determined for the two subsections 4 and 6 (i.e., F2 is determined twice), a frequency center F3 of gravity is determined for the two subsections 5 and 8 (i.e., F3 is determined twice), a frequency center F4 of gravity is determined for the one subsection (i.e., F4 is determined once), and a frequency center F5 of gravity is determined for the one subsection 10 (i.e., F5 is determined once). In this case, the most frequently determined frequency center of gravity is F1, and thus, F1 is specified as the most frequent value. The most-frequent-value specifying unit 9 inputs the thus-determined most-frequent-value data described above to the evaluation data output unit 11.

To the evaluation data output unit 11, load data as well as the most-frequent-value data are input. The load data are data in which a tensile load applied to a test body at each time point in each section in a test period is associated with the section. A load data generation unit 17 may be provided. The load data generation unit 17 generates load data, based on a measured value of a tensile load applied to a test body and time measured by the time measurement unit 15, and inputs the load data to the evaluation data output unit 11. The measured value of a load may be a value measured by an appropriate sensor.

The evaluation data output unit 11 generates strength evaluation data, based on the input most-frequent-value data and load data, and outputs the strength evaluation data. The strength evaluation data include the most frequent value in each section and a tensile load applied to a test body in the section (e.g., applied to the test body at each time point in the section). Accordingly, the evaluation data output unit 11 may output, as the strength evaluation data, data in which the most frequent value in each section is associated with a tensile load applied to a test body in the section.

In the present embodiment, the evaluation data output unit 11 outputs the strength evaluation data to the display device 19 and the tensile strength determination unit 13. The display device 19 and the tensile strength determination unit 13 may be constituent elements of the strength evaluation device 10.

The display device 19 displays strength evaluation data (e.g., the data in FIG. 3B described below) on a screen thereof.

The tensile strength determination unit 13 specifies a tensile strength of a test body, based on the strength evaluation data, and outputs the tensile strength. More specifically, the tensile strength determination unit 13 specifies a section that is among a plurality of sections in a test period and whose most frequent value becomes lower than the most frequent value of the preceding (e.g., immediately preceding) section, and outputs, as a tensile strength of the test body, the maximum value of a tensile load that has been applied until the specified section. In other words, the tensile strength determination unit 13 outputs, as the tensile strength of the test body, the maximum value of a tensile load that has been applied to the test body in a period from a start time point of the test period to an end time point of the specified section. This tensile strength is output to the display device 19 from the tensile strength determination unit 13, for example. In this case, the display device 19 displays, on the screen, the tensile strength received from the tensile strength determination unit 13. In the case where the display device 19 displays the tensile strength on the screen, the display device 19 does not necessarily need to display the test body strength evaluation data on the screen.

[Strength Testing Method]

Figure 2:
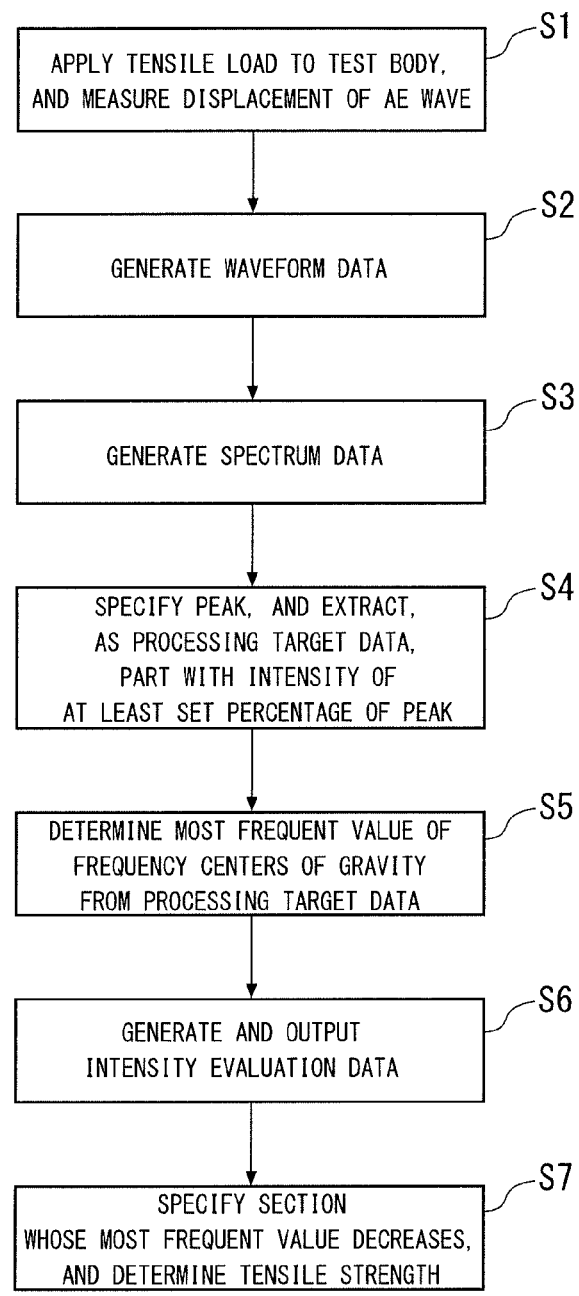
FIG. 2 is a flowchart illustrating a strength testing method according to the embodiment of the present disclosure.

FIG. 2 is a flowchart illustrating a strength testing method according to the embodiment of the present disclosure. The strength testing method includes the following steps S1 to S7 in order to test, for a tensile strength, a test body that is a fiber reinforced composite material. The strength testing method is performed using the strength evaluation device 10.

At the step S1, a tensile load applied to a test body is increased as time elapses in a test period from a test start time point to a test end time point. At the step S1, a displacement of an AE wave generated in the test body by the tensile load is measured at each time point within the test period. This measurement is performed by an AE sensor (e.g., a piezoelectric element) attached to the test body.

At the step S2, based on the displacement of the AE wave at each time point detected at the step S1, the above-described waveform data in each of a plurality of continuous sections included in the test period are generated. The step S2 is performed by the waveform generation unit 3.

At the step S3, for each of the sections, from the waveform data of the section generated at the step S2, spectrum data representing an intensity of the AE wave at each frequency are generated. The step S3 is performed by the spectrum generation unit 5.

At the step S4, for each of the sections, a peak of an intensity in the spectrum data of the section generated at the step S3 is specified, and a data part that is included in the spectrum data and in which an intensity is equal to or higher than a value of a set percentage of the peak is extracted as processing target data. The step S4 is performed by the data extraction unit 7.

At the step S5, for each of the sections, based on the processing target data of the section extracted at the step S4, the most frequent value of frequency centers of gravity of the AE wave in the section is specified. The step S5 is performed by the most-frequent-value specifying unit 9.

At the step S6, the most frequent value of each section specified at the step S5 and the tensile strength applied to the test body in each section are output as strength evaluation data for evaluating a tensile strength of the test body. The step S5 is performed by the evaluation data output unit 11. The output at the step S5 may be performed to the display device 19 and the tensile strength determination unit 13.

At the step S7, based on the strength evaluation data output at the step S6, the section that is among a plurality of the sections constituting the test period and whose most frequent value becomes lower than the most frequent value of the preceding section is specified. This specifying may be performed by the above-described tensile strength determination unit 13 described above, or may be performed by a person who views the strength evaluation data displayed on the screen of the above-described display device 19. At the step S7, the maximum value of a tensile load that has been applied from the test start time point until the specified section is determined as a tensile strength of the test body by the tensile strength determination unit 13 or a person.

One or more AE sensors may be used at the step S1. When a plurality of AE sensors are used, the steps S2 to S4 may be performed based on a displacement of an AE wave measured by each of the AE sensors at the step S1. In other words, for each of the AE sensors, the processing target data may be acquired by the steps S2 to S4. In this case, at the step S5, for each section, the most-frequent-value specifying unit 9 may determine a frequency center of gravity of each subsection, concerning a plurality of pieces of the processing target data (i.e., the above-described processing target time data) that are relevant to a plurality of the AE sensors, and may specify, as the most frequent value of the section, the frequency center of gravity that is among all of these frequency centers of gravity and that has been most frequently determined.

The above-described steps S2 to S7 may be performed while the step S1 is performed. In other words, every time elapsed time passes each section, the steps S2 to S7 are performed for the section. In this case, at the step S6, the strength evaluation data for each section in a period from the test start time point to the latest section may be output in real time. In this case, every moment, the load data generation unit 17 may generate load data up to the present moment, and may input the load data to the evaluation data output unit 11 for real-time output of the strength evaluation data.

Example

Figure 3A:
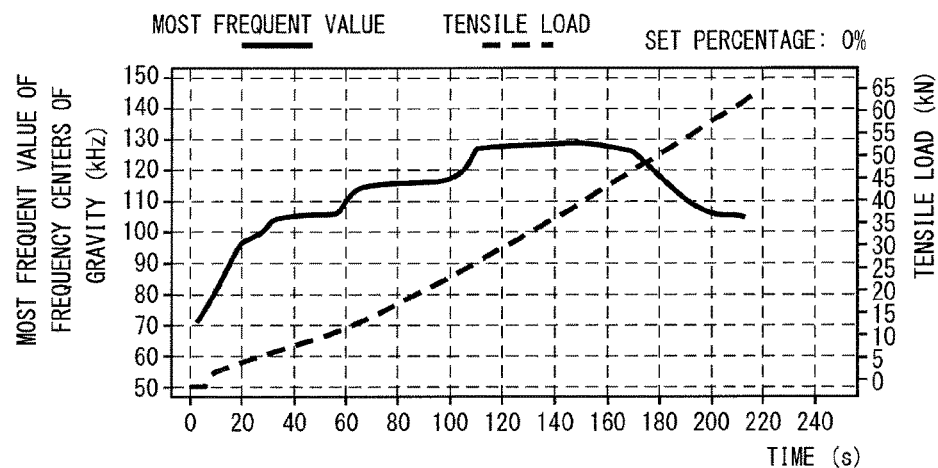
FIG. 3A illustrates a relation between time and each of the most frequent value of frequency centers of gravity for each section in a test period and a tensile load applied to a test body, and illustrates the case where a set percentage for a peak is zero.
Figure 3B:
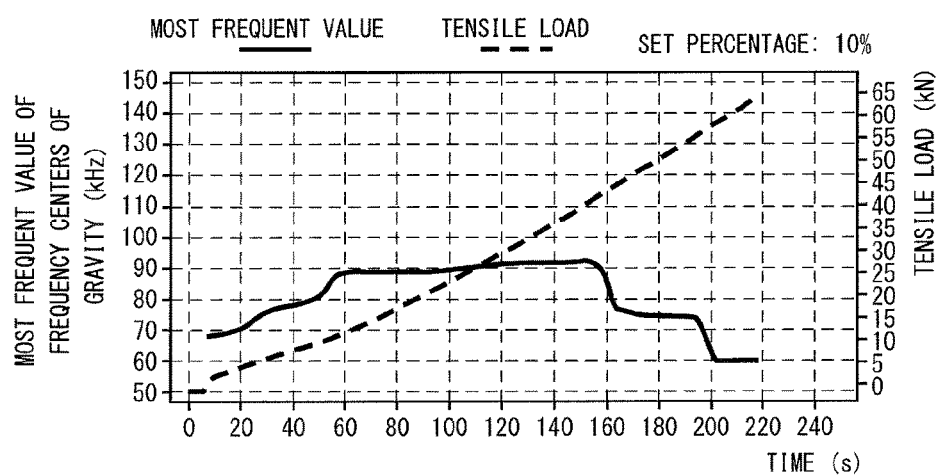
FIG. 3B illustrates a relation between time and each of the most frequent value of frequency centers of gravity for each section in the test period and a tensile load applied to the test body, and illustrates the case where a set percentage for a peak is 10%.
Figure 3C:
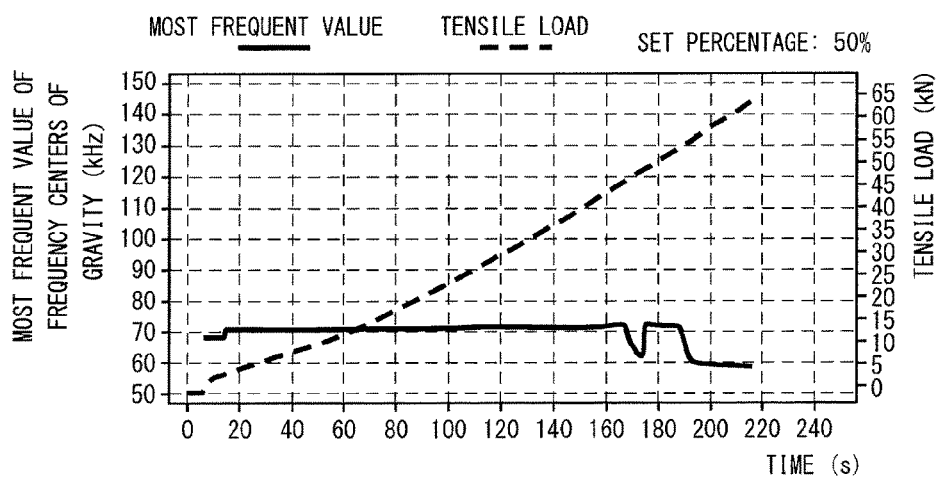
FIG. 3C illustrates a relation between time and each of the most frequent value of frequency centers of gravity for each section in the test period and a tensile load applied to the test body, and illustrates the case where a set percentage for a peak is 50%.

FIG. 3A to FIG. 3C are schematic diagrams illustrating results acquired by the strength testing method according to an example of the present disclosure.

FIG. 3A to FIG. 3C each illustrate a relation between time and each of the most frequent value of frequency centers of gravity and a tensile load applied to a test body as CFRP. In FIG. 3A to 3C, the thick solid line represents the most frequent value, and the thick broken line represents a tensile load. FIG. 3A to FIG. 3C illustrate the results acquired for the same one-time tensile strength testing on the same test body. FIG. 3A illustrates the result in the case where the above-described set percentage of a peak used at the step S4 is zero (i.e., the case that does not correspond to the present disclosure). FIG. 3B illustrates the result in the case where the above-described set percentage of a peak used at the step S4 is 10% (i.e., the case of an example of the present disclosure). FIG. 3B illustrates the result in the case where the above-described set percentage of a peak used at the step S4 is 50%.

As illustrated in FIG. 3A to FIG. 3C, in the present example, a tensile load is applied to the test body so as to gradually increase as time elapses. A test start time point is a time point immediately after a value of 5 seconds on the horizontal axis in each drawing. Each of FIG. 3A to FIG. 3C roughly illustrates, with the solid curved line, the most frequent value of frequency centers of gravity calculated for each section.

In the case of FIG. 3A where the set percentage is 0%, the most frequent value decreases at a time point (section) when a value on the horizontal axis is 155 seconds, and the maximum value of a tensile load at or before this time point is approximately 42 kN. Accordingly, it can be understood that the test body is broken when a tensile load of 42 kN is applied to the test body. In the case of FIG. 3A, because of the set percentage of 0%, the intensity evaluation data include a high-frequency noise, and thus, it is somewhat difficult to recognize the time point when the most frequent value decreases.

In the case of FIG. 3B where the set percentage is 10%, the most frequent value decreases at a time point (section) when a value on the horizontal axis is 155 seconds, and the maximum value of a tensile load at or before this time point is approximately 42 kN. Since the set percentage is an appropriate value, the intensity evaluation data do not include a high-frequency noise, and thus, the most frequent value decreases more sharply than in the case of FIG. 3A, and this decrease time point is more easily recognized.

In the case of FIG. 3C where the set percentage is 50%, the most frequent value decreases at a time point when a value on the horizontal axis is 168 seconds, and the maximum value of a tensile load at or before this time point is approximately 46 kN. Accordingly, the determined value of a tensile load is slightly shifted from the accurate value of 42 kN. In the case of FIG. 3C, a range of frequency centers of gravity used for determining the most frequent value is narrow, and thus, it is more difficult to recognize the time point when the most frequent value decreases than in the case of FIG. 3B. Therefore, it can be said that 10% is more preferable as the set percentage.

Advantageous Effects of Embodiment

According to the above-described embodiment, for each section of time, spectrum data are generated from waveform data of an AE wave generated in a test body by a tensile load, a peak of an intensity in the spectrum data is specified, and a data part that is included in the spectrum data and in which an intensity is equal to or higher than a value of a set percentage of the peak is extracted as processing target data. Accordingly, processing on all the spectrum data is unnecessary, and thus, a tensile strength of the test body can be determined in shorter processing time.

In the example, a tensile strength of a test body at the step S7 can be acquired in real time while tensile strength testing of the test body is performed, i.e., while the above-described step S1 is performed. Meanwhile, when the above-described set percentage is zero, a tensile strength of a test body cannot be acquired in real time. Thus, the above-described set percentage enables a tensile strength to be acquired in real time.

Since a data part in which an intensity is equal to or higher than a value of the set percentage of a peak is extracted, important data part can be extracted without selecting a processing-target frequency range.

The above-described strength evaluation device 10 can be implemented by a computer, one or more programs (software), and a storage medium, for example. In this case, the one or more programs cause the computer to execute the above-described processing steps of the strength evaluation device 10. In this case, the storage medium may be a computer-readable medium (e.g., a hard disk, a CD-ROM, or the like of the computer) that non-temporarily stores the one or more programs.

In this case, in the example, the above-described steps S2 to S4 can be performed by two pieces of software, and the steps S5 and S6 can be performed by another piece of software, enabling the strength evaluation device 10 to be implemented by a total of the three pieces of software. In other words, the set percentage reduces an amount of data to be processed, and thus, a plurality of pieces of software for handling a large amount of data are unnecessary, resulting in that the number of used pieces of software is reduced from five to three. Data amount processed by the software is reduced to one fortieth or less, and strength evaluation data can be displayed simultaneously (in real time) with the step S1.

The present disclosure is not limited to the above-described embodiment, and various modifications can be made without departing from the essence of the present disclosure.

For example, one of the display device 19 and the tensile strength determination unit 13 may be omitted. Alternatively, both of the display device 19 and the tensile strength determination unit 13 may be omitted. In this case, the evaluation data may be output to another device (e.g., a printer device or a storage device).

REFERENCE SIGNS LIST 3 waveform generation unit, 5 spectrum generation unit, 7 data extraction unit, 9 most-frequent-value specifying unit, 10 strength evaluation device, 11 evaluation data output unit, 13 tensile strength determination unit, 15 time measurement unit, 17 load data generation unit, 19 display device

The invention claimed is:

1. A strength testing method of testing, for a tensile strength, a test body that is a fiber reinforced composite material, the method comprising:
    applying a tensile load to the test body so as to increase as time elapses, and detecting, at each time point, by an AE sensor, a displacement of an AE wave generated in the test body by the tensile load;
    generating, based on the displacement of an AE wave detected at each time point, for each section of time, waveform data that represents a displacement of the AE wave at each time point;
    generating, for each of the sections, from the waveform data, spectrum data representing an intensity of an AE wave at each frequency;
    specifying, for each of the sections, a peak of an intensity in the spectrum data;
    extracting, for each of the sections, as processing target data, a data part that is included in the spectrum data and in which an intensity is equal to or higher than a value of a set percentage of the peak;
    specifying, for each of the sections, a most frequent value of frequency centers of gravity, based on the processing target data; and
    outputting, as strength evaluation data for evaluating a tensile strength of the test body, the most frequent value for each of the sections and a tensile load applied to the test body in each of the sections.

2. The strength testing method according to claim 1, comprising:
    specifying, based on the output strength evaluation data, the section whose most frequent value becomes lower than the most frequent value of the preceding section; and
    specifying, as a tensile strength of the test body, a maximum value of a tensile load that has been applied until the specified section.

3. A strength evaluation device wherein when a tensile load is applied to a test body as a fiber reinforced composite material so as to increase as time elapses, based on an AE wave generated in the test body by the tensile load,
the strength evaluation device generates data enabling evaluation of a tensile strength of the test body,
the strength evaluation device comprising:
    a waveform generation unit that generates waveform data for each section of time, based on a displacement of the AE wave detected at each time point by an AE sensor, the waveform data representing the displacement of an AE wave at each time point;
    a spectrum generation unit that generates spectrum data from the waveform data for each of the sections, the spectrum data representing an intensity of an AE wave at each frequency;
    a data extraction unit that specifies a peak of an intensity in the spectrum data for each of the sections, and extracts, as processing target data, a data part that is included in the spectrum data and in which an intensity is equal to or higher than a value of a set percentage of the peak;
    a most-frequent-value specifying unit that specifies a most frequent value of frequency centers of gravity of an AE wave in each of the sections, based on the processing target data for the section; and
    an evaluation data output unit that outputs, as strength evaluation data, the most frequent value for each of the sections and a tensile load applied to the test body in each of the sections.

4. The strength evaluation device according to claim 3, comprising a tensile strength determination unit that specifies, based on the strength evaluation data, the section whose most frequent value becomes lower than the most frequent value of the preceding section, and specifies, as a tensile strength of the test body, a maximum value of a tensile load that has been applied until the specified section.

* * * * *